United States Patent [19]

Black III

[11] 3,942,604
[45] Mar. 9, 1976

[54] SAFETY SYSTEM FOR LAWN MOWERS OR OTHER VEHICLES
[75] Inventor: Charles E. Black III, Mount Prospect, Ill.
[73] Assignee: Indak Manufacturing Corporation, Northbrook, Ill.
[22] Filed: Aug. 13, 1974
[21] Appl. No.: 497,087

[52] U.S. Cl............. 180/103 R; 56/10.8; 180/82 A; 200/157
[51] Int. Cl.²........................................ B60K 26/00
[58] Field of Search.......... 180/103, 82 A, 82 R, 99, 180/19 H; 56/10.8; 192/.098; 200/61.83, 157; 123/198 DC

[56] References Cited
UNITED STATES PATENTS

| 3,141,944 | 7/1964 | De Voe | 200/157 |
| 3,228,177 | 1/1966 | Coates | 56/10.8 X |
| 3,229,452 | 1/1966 | Hasenbank | 180/82 R X |
| 3,608,285 | 9/1971 | Berk | 180/82 R X |
| 3,626,676 | 12/1971 | Miley | 180/82 X |
| 3,783,216 | 1/1974 | Plamper | 180/82 R X |
| 3,800,616 | 4/1974 | Hoffmeyer | 180/19 H X |
| 3,849,620 | 11/1974 | Melisz | 200/157 |

*Primary Examiner*—M. H. Wood, Jr.
*Assistant Examiner*—Terrance L. Siemens
*Attorney, Agent, or Firm*—Burmeister, York, Palmatier, Hamby & Jones

[57] ABSTRACT

The disclosed safety system is particularly applicable to walk-behind lawn mowers of the type having a drive including a control, movable between drive and neutral positions. The safety system includes a drive switch, movable between drive and neutral positions. The safety system also includes a deadman control, biased toward an off position and manually movable to an on position. The deadman control operates a deadman switch between off and on positions. The lawn mower includes a drive motor having a safety circuit for disabling the motor. The drive switch and the deadman switch are connected into the safety circuit and are provided with contacts for disabling the motor when the drive switch is in its drive position and the deadman switch is in its off position. Such contacts are also operative to disable the motor when the drive switch is in its neutral position and the deadman switch is in its on position. In a modified construction, the safety system also includes a starting interlock switch operable by the starting device for the motor. The starting interlock switch is operable to a first position when the starting device is not in use and a second position when the starting device is in use. The starting interlock switch is connected into the safety circuit and is provided with contacts for disabling the motor when the drive switch is in its drive position and the starting interlock switch is in its second position, regardless of the position of the deadman switch.

9 Claims, 6 Drawing Figures

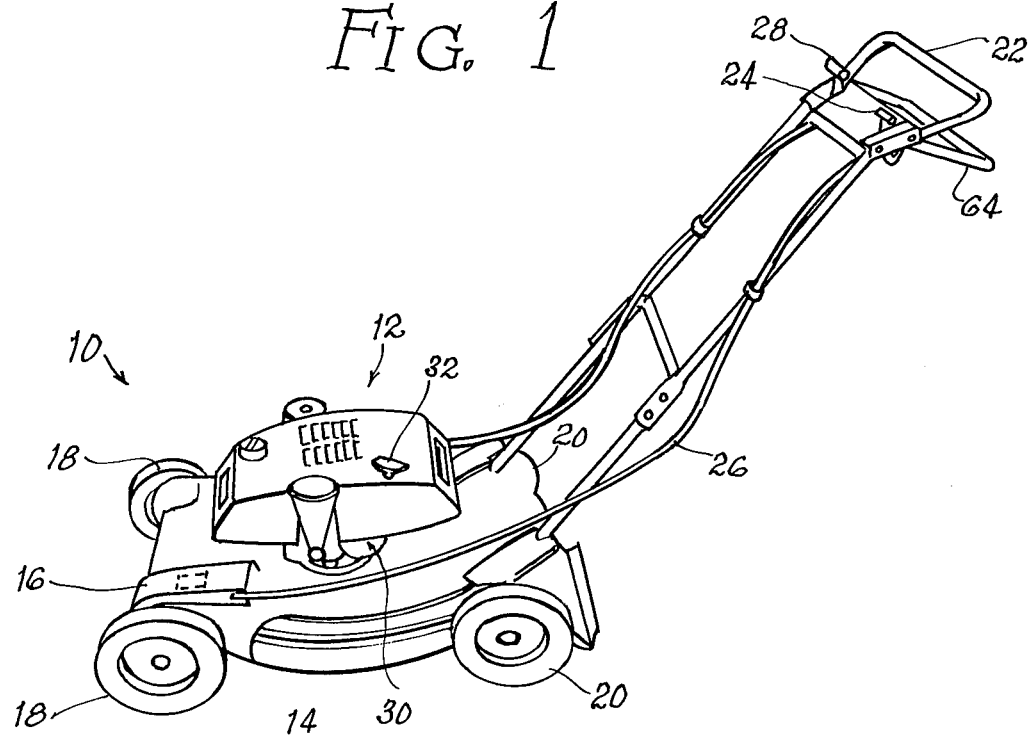
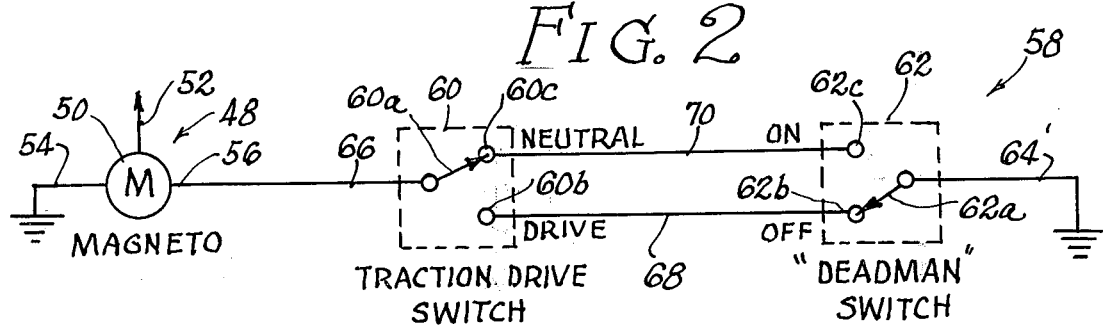
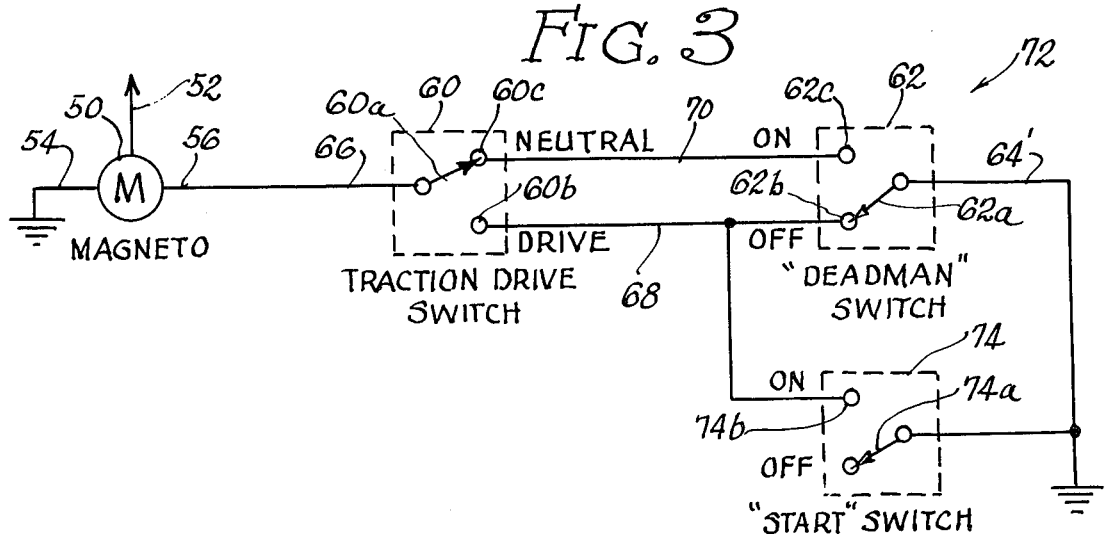

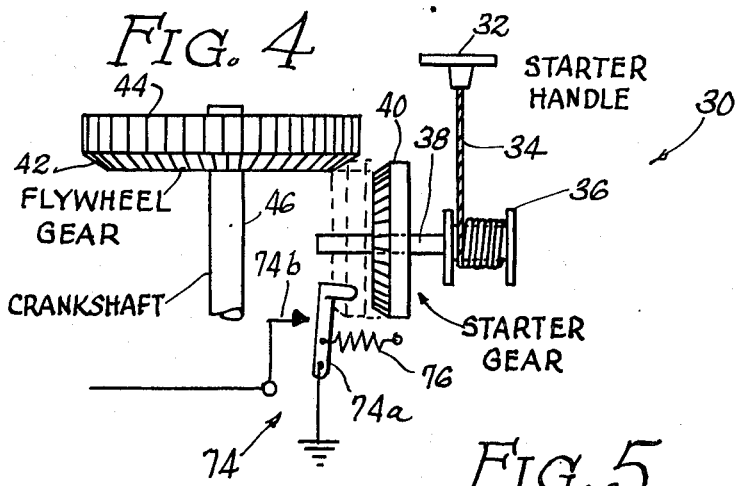
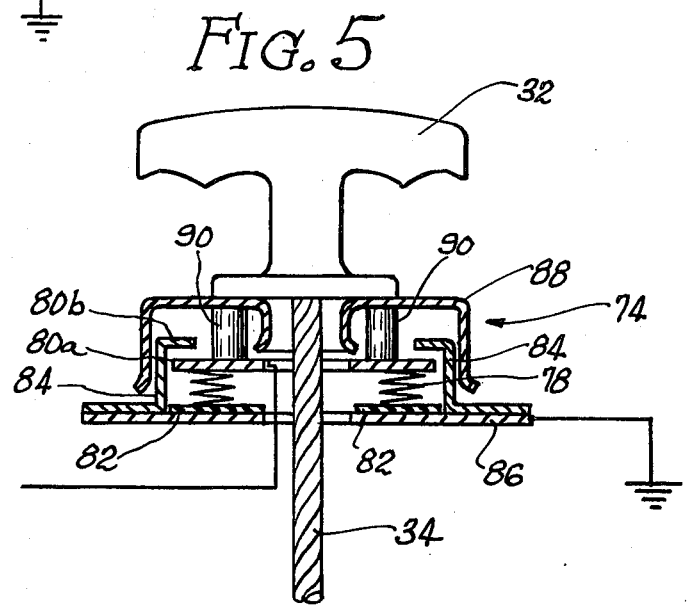
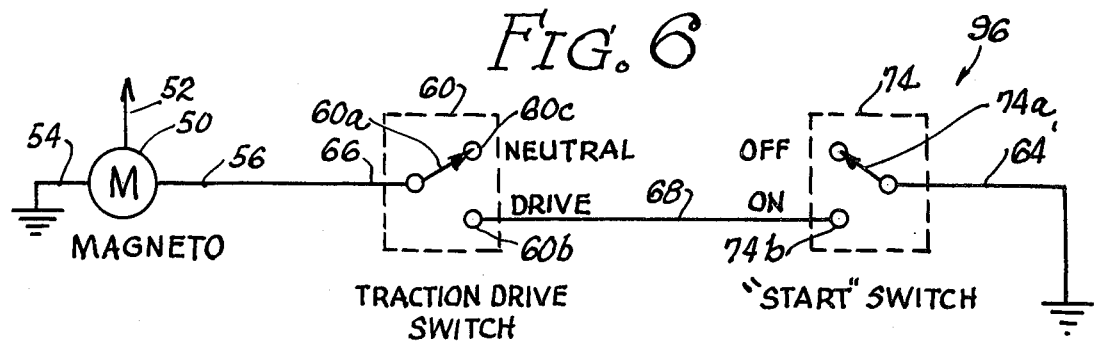

SAFETY SYSTEM FOR LAWN MOWERS OR OTHER VEHICLES

This invention relates to a safety system which is especially advantageous for use with walk behind lawn mowers. However, the system is also applicable to other vehicles.

The safety system of the present invention is especially well adapted for use with self-propelled, power operated lawn mowers of the type having a selectively operable traction drive which receives its power from a drive motor. The traction drive usually has a control member which is movable between a drive position, in which the traction drive is actuated or engaged, and a neutral position, in which the traction drive is not actuated.

The general object of the present invention is to provide a new and improved safety system which will prevent the operation of such a lawn mower in one or more unsafe modes. One particular object of the present invention is to prevent the drive motor from being started when the traction drive system is actuated. Without the benefit of the safety system, the lawn mower may move ahead in an unsafe manner, if the motor is started with the traction drive system in its actuated or engaged condition.

Another object is to provide a new and improved safety system which will stop the drive motor if the operator releases his grasp upon the steering handle of the lawn mower. In the absence of the safety system, the lawn mower may travel ahead in an unsafe manner if the operator loses or releases his grasp on the handle.

In accordance with the present invention, the safety system preferably comprises a traction drive switch which is operable by the traction drive system between a drive position when the traction drive system is actuated, and a neutral position when the traction drive system is not actuated. The safety system also preferably includes a deadman control which is biased to an off position and is movable by the operator to an on position. A deadman switch is operable by the deadman control between corresponding off and on positions. The deadman control may take the form of a movable lever or other member on the steering handle of the lawn mower. During normal operation of the lawn mower, the operator grasps the deadman control, as well as the steering handle, and moves it to its on position. The deadman control is biased to its off position, so that it returns to its off position if the operator fails to maintain his grasp on the deadman control. The traction drive switch and the deadman switch are connected into a safety circuit for the drive motor of the lawn mower. The traction drive switch and the deadman switch are provided with contact means for disabling the drive motor if the traction drive switch is in its drive position and the deadman switch is in its off position, while enabling the motor if the deadman switch is in its on position. Such contact means are also operative to enable the drive motor if the traction drive switch is in its neutral position and the deadman switch is in its off position.

In a modified construction, the safety system also employs a starting interlock switch which is connected into the safety circuit for the drive motor, and is movable by the starting device for the drive motor between a first position when the starting device is not in use and a second position when the starting device is in use. The starting interlock switch includes contact means for disabling the drive motor if the traction drive switch is in its drive position, and the starting interlock switch is in its second position, regardless of the position of the deadman switch. In this way, the drive motor cannot be started when the traction drive switch is in its drive position, even though the deadman switch may be operated to its on position.

In another modification, the safety system utilizes only the traction drive switch and the starting interlock switch, in an arrangement whereby the drive motor is disabled if the traction drive switch is in its drive position, and the starting interlock switch is in its second position, so that the drive motor cannot be started with the traction drive switch in its drive position. However, when the drive motor has been started, it can continue to operate when the traction drive switch is moved to its drive position.

Further objects, advantages and features of the present invention will appear from the following description, taken with the accompanying drawings, in which:

FIG. 1 is a perspective view of a lawn mower which is equipped with a safety system to be described as an illustrative embodiment of the present invention.

FIG. 2 is a schematic circuit diagram of the safety system.

FIG. 3 is a schematic circuit diagram showing a modified safety system to which a starting interlock switch has been added.

FIG. 4 is a fragmentary diagrammatic elevational view showing one embodiment of the starting interlock switch.

FIG. 5 is a fragmentary diagrammatic elevational section, showing another embodiment of the starting interlock switch.

FIG. 6 is a schematic circuit diagram showing another modified safety system, utilizing only a traction drive switch and a starting interlock switch.

As just indicated, FIG. 1 illustrates a power lawn mower 10 of the walk behind type, having a drive motor 12, adapted to supply power to cut the grass, and also to propel the lawn mower 10 along the surface of the ground. Illustrated lawn mower 10 is of the rotary type, having a housing 14 on which the drive motor 12 is mounted. The housing 14 acts as a guard for the rotary cutting blade, not shown. It will be understood that the present invention is applicable to all types of power lawn mowers. The drive motor 12 is adapted to supply power to a traction drive system 16, which is selectively operable to transmit driving power to one or more wheels 18 which support the housing 14. In this case, the traction drive system 16 supplies power to the front wheels 18 of the lawn mower, but the invention is applicable to traction drives of all suitable types. Illustrated lawn mower 10 also has rear wheels 20 which support the housing 14 but are not supplied with propulsion power.

The lawn mower 10 has a handle 22 which may be grasped by the operator to steer and guide the lawn mower. The traction drive system 16 preferably includes selectively operable control means, which may comprise a control member 24 movable between a drive position, in which the traction drive system 16 is actuated or engaged, and a neutral position, in which the traction drive system is not actuated, or is disengaged. In this case, the control member 24 takes the form of a movable lever which is mounted on the handle 22 for convenient operation by the operator as he walks behind the lawn mower. The lever 24 is connected to the traction drive system 16 by a control cable 26.

The illustrated lawn mower 10 also has a speed control in the form of a movable lever 28 which is also mounted on the handle 22 and is operable to change the speed of the drive motor 12.

The lawn mower 10 preferably includes a starting device 30 for starting the drive motor 12. The illustrated starting device 30 is of the recoil type utilizing a pull handle 32 which is pulled out vigorously by the operator to start the motor 12. As illustrated in FIGS. 4 and 5, the pull handle 32 may be connected to a rope or line 34 which is normally coiled on a reel 36. When the handle 32 is pulled outwardly, the rope 34 causes rotation of the reel 36 which in turn rotates a shaft 38. The rotation of the shaft 38 is transmitted to a starter gear 40, adapted to be moved automatically into mesh with a gear 42 on the flywheel 44 of the drive motor 12. The flywheel 44 is mounted on the crankshaft 46 of the motor 12.

When the motor 12 starts, the starter gear 40 is automatically kicked out of mesh with the flywheel gear 42. The operator then allows the rope 34 to be recoiled on the reel 36 by spring action. The pull handle 32 is thus returned to its original position, with the rope 34 fully retracted. It will be understood that the present invention is applicable to power mowers having starting devices of various suitable types. Thus, for example, the invention is applicable to power mowers of the electric start type, having a starting device which is electrically operated under the control of a key switch or the like.

The drive motor 12 for the lawn mower 10 includes a safety circuit 48, whereby the motor can be disabled, to prevent operation of the motor under unsafe conditions. In this case, the safety circuit 48 utilizes the ignition magneto 50 which is adapted to supply the spark ignition for the motor 12. A high voltage lead 52 extends from the secondary circuit of the magneto 50 to the spark plug of the motor 12. The safety circuit 48 utilizes the primary circuit, having a ground lead 54 and an ungrounded lead 56. The magneto 50 can be disabled by short circuiting the lead 56 to ground, which will prevent the magneto from generating the high voltage for the spark ignition. It will be understood that the present invention is applicable to ignition systems of any other suitable type, such as an ignition system utilizing a coil and a battery.

The lawn mower 10 is equipped with a safety system 58 which prevents the drive motor 12 from being started when the traction drive system 16 is engaged. The safety system also prevents the lawn mower from being propelled forwardly, unless it is controlled by the guiding hand of the operator. If the operator loses his grasp on the mower, while the traction drive system 16 is engaged, the drive motor 12 will be stopped automatically.

As shown in FIG. 2, the safety system 58 comprises a traction drive switch 60, operable by the traction drive system 16, between a neutral position, in which the the traction drive system 16 is disengaged, and a drive position, in which the traction drive system is engaged or actuated.

The safety system 58 also includes a deadman switch 62 which is operable by a deadman control 64, movable between on and off positions. The deadman control 64 is preferably biased toward its off position and is movable manually by the operator to its on position. As shown in FIG. 1, the deadman control is in the form of a swingable bail or lever, mounted on the handle 22. The deadman lever 64 is biased by gravity to its off position, as shown in FIG. 1, and is swingable upwardly to its on position, close to the handle 22. Thus, the operator can readily grasp the deadman lever 64 and hold it in its on position, while he simultaneously holds the handle 22 to steer and quide the lawn mower 10. If the operator releases the deadman lever 64, it automatically falls downwardly by its own weight to its off position. The deadman switch 62 is operable by the deadman control 64 between corresponding on and off positions.

As shown in FIG. 2, the traction drive switch 60 and the deadman switch 62 are connected into the safety circuit 48 for the drive motor 12. The switches 60 and 62 include contact means for disabling the drive motor 12 if the traction drive switch 60 is in its drive position and the deadman switch is in its off position, while enabling the operation of the motor 12 if the deadman switch 62 is moved to its on position. Such contact means are also operative to enable the drive motor 12 if the traction drive switch is in its neutral position and the deadman switch 62 is in its off position, while disabling the drive motor if the deadman switch is moved to its on position.

In the detailed construction of FIG. 2, the contact means of the traction drive switch 60 include a first contact 60a which is movable between second and third contacts 60b and c. When the switch 60 is in its drive position, the movable contact 60a engages the fixed contact 60b. When the switch 60 is in its neutral position, the movable contact 60a engages the contact 60c.

The contact means of the deadman switch 62 include a first contact 62a which is engageable with a second contact 62b when the switch is in its off position, and is movable into engagement with a third contact 62c when the switch is in its on position.

In the safety system 58 of FIG. 2, first circuit elements are employed to connect the traction drive switch 60 and the deadman switch 62 into the safety circuit 48. Such first circuit elements comprise leads 64' and 66, connected to the grounded and ungrounded primary leads 54 and 56 of the magneto 50. In this case, the lead 66 is connected to the movable contact 60a, while the lead 64 is connected to the movable contact 62a, but this situation could be reversed.

As shown in FIG. 2, second and third circuit elements are connected between second and third contacts of the traction drive switch 60 and the deadman switch 62. Such circuit elements take the form of leads 68 and 70. The lead 68 is connected between the contacts 60b and 62b, while the lead 70 is connected between the contacts 60c and 62c.

The operation of the safety system 58 will now be evident. When the drive motor 32 is to be started, the traction drive switch must be in its neutral position, while the deadman switch 62 must be in its off position, as shown in FIG. 2. The contact 60a engages the contact 60c, while the contact 62a engages the contact 62b. Thus, the magneto primary leads 54 and 56 are not short circuited, so that the motor 12 is enabled and can be started. If the traction drive switch 60 is in its drive position, the contact 60a engages the contact 60b, so that the magneto primary leads 54 and 56 are short circuited through the contacts 60a and b, the lead 68, and the contacts 62a and b. Thus, the motor 12 is disabled so that it cannot be started.

When the motor 12 has been started, and it is desired to cause the lawn mower 10 to be propelled along the surface of the ground, the traction drive control 24 must be moved to its drive position, while simultaneously the deadman control 64 is moved to its on position. Correspondingly, the traction drive switch 60 is moved to its drive position, while the deadman switch 62 is moved to its on position. The contact 60a engages the contact 60b while the contact 62a engages the contact 62c, so that the magneto 50 is not short circuited. Thus, the motor 12 continues to run, so that it will propel the lawn mower 10.

If the operator releases the deadman control 64, it returns by its biasing action to its off position, in which the contact 62a engages the contact 62b. Accordingly, the primary ignition leads 54 and 56 are short circuited by the closed circuit comprising the lead 66, the contacts 60a and b, the contacts 62a and b and the lead 64', so that the motor 12 is disabled and will immediately stop. Thus, the lawn mower 10 cannot run away under its own power, without the guiding hand of the operator.

FIG. 3 illustrates a modified safety system 72 which utilizes all of the components of the safety system 58 of FIG. 2. In addition, the safety system 72 employs a starting interlock switch 74 which prevents the starting of the drive motor 12 when the traction drive switch 60 is in its drive position, regardless of the position of the deadman switch 62. The starting interlock switch 74 is operable by the starting device 30 on the drive motor 12, so that the starting interlock switch 74 is in a first position when the starting device 30 is not in use and a second position when the starting device is in use. In this case, the starting interlock switch 74 is in an off position when the starting device 30 is not in use, while being in an on position when the starting device is in use. Thus, the starting interlock switch 74 includes a first contact 74a which is movable into engagement with a second contact 74b when the starting device 30 is in use. When the starting device is not in use, the contact 74a is moved out of engagement with the contact 74b.

In the specific safety system 72 of FIG. 3, the starting interlock switch 74 is connected between the contacts 62a and 62b of the deadman switch 62. Thus, the movable contact 74a is connected to the contact 62a, while the contact 74b is connected to the contact 62b. When the starting device 30 is in use, the starting interlock switch 74 is in its on position, and thus is closed, so that the contact 60b of the traction drive switch is connected to ground, regardless of the position of the deadman switch 62. If the traction drive switch 60 is in its drive position, the contact 60a is engaged with the contact 60b, so that the ignition magneto 50 is disabled. Thus, the drive motor 12 cannot be started.

The safety system 72 of FIG. 3 thus obviates an unsafe condition which is a remote possibility with the safety system 58 of FIG. 2. In the safety system 58, the drive motor 12 can be started when the traction drive switch 60 is in its drive position, if the deadman switch 62 is erroneously moved to its on position. This should not happen, unless the operator is highly negligent. However, this remote possibility of an unsafe condition is obviated by the safety system 72, in which any attempt to start the motor 12 will cause closure of the starting interlock switch 74, so that the primary circuit of the ignition magneto 50 will be short circuited to ground through the traction drive system 60 and the starting interlock system 74 if the traction drive switch is in its drive position.

FIGS. 4 and 5 illustrate two embodiments of the starting interlock switch 74. In the embodiment of FIG. 4, the movable contact 74 is in the form of a lever which is operable by the starter gear 40 in the starting device 30. When the starting gear 40 is moved into mesh with the flywheel gear 42, the lever 74a is moved into engagement with the contact 74b, which may be in the form of a spring contact. The contact lever 74a is provided with a biasing spring 76 which moves the lever 74a out of engagement with the contact 74b, when the starter gear 40 is moved out of mesh with the flywheel gear 42. Thus, the contact lever 74a engages the contact 74b when the starting device 30 is in use, but is moved out of engagement with the contact 74b when the starting device is not in use.

In the modified embodiment of FIG. 5, the starting interlock switch 74 is operable by the pull handle 32 of the starting device 30. When the handle 32 is not being used, the starting interlock switch 74 is held open by the spring action of the take-up reel 36. When the handle 32 is pulled outwardly in an attempt to start the motor 12, the starting interlock switch 74 is closed by springs 78. In this case, the starting interlock switch 74 comprises a movable contact 80a and one or more fixed contacts 80b. The movable contact 80a is in the form of a ring-shaped disc or plate which is biased outwardly by the springs 78. As shown in FIG. 5, the springs 78 are in the form of compression coil springs which are disposed between the disc 80a and an electrically insulating member 82. Three of the springs 78 are preferably employed. When the starting handle 32 is pulled outwardly, the springs 78 push the disc 80a outwardly against the contacts 80b, which may be in the form of flanges on grounded brackets 84. Three of the contacts 80b and brackets 84 may be employed. The brackets 84 may be mounted on a wall or housing 86 on the drive motor 12.

When the handle 32 is released, it engages a slidable housing member 88 which is pushed inwardly by the tension in the rope 34. The slidable housing member 88 includes one or more elements 90 which are engageable with the contact disc 80a and are operative to push the contact disc away from the contacts 80b, due to the tension in the rope 34. It will be recalled that the rope 34 is tensioned by the spring take-up reel 36.

Thus, the contact disc 80a is held away from the contacts 80b so that the starting interlock switch 74 is open when the starting handle 32 is not in use. When the handle 32 is pulled outwardly, the springs 78 cause the contact disc 80a to engage the contacts 80b, so that the starting interlock switch 74 is closed.

FIG. 6 illustrates another modified safety system 96 which is the same as the safety system 72 of FIG. 3, except that the deadman switch 62 is not used. Thus, the second contact 60b of the traction drive switch 60 is connected soley to the second contact 74b of the starting interlock switch 74. The motor 12 when the traction drive switch 60 is in its drive position. Any attempt to start the motor 12 causes closure of the start switch 74, so that the magneto 50 is short circuited through the lead 66, the traction drive switch contacts 60a and b, the lead 68, the starting interlock switch contacts 74a and b, and the lead 64.

The modified safety system 96 of FIG. 6 is especially useful when the lawn mower 10 has some other arrangement for preventing the mower from being propelled forwardly when the mower is not being guided by the operator. For example, certain lawn mowers cannot be propelled forwardly unless the operating handle 22 is swung upwardly by the operator. Other lawn mowers cannot be propelled forwardly unless the operator pushes downwardly on the operating handle.

In the safety systems of FIGS. 2, 3 and 6, the engine or drive motor 12 is disabled by closure of the safety circuit, and is enabled by the opening of the circuit. It will be understood that this situation can be reversed. By inserting the safety circuit in series with the ignition primary, the motor 12 can be disabled by an open circuit, while being enabled by a closed circuit. To accommodate this reversal, appropriate modifications must be made in the safety switches.

Thus, if the safety system 58 of FIG. 2 is inserted in series with the ignition primary, the polarity of one of the safety switches 60 and 62 must be reversed. For example, the on and off positions of the deadman switch 62 may be interchanged, so that the safety circuit will be closed if the traction drive switch 60 is in its neutral position, and the deadman switch 62 is in its off position. The safety circuit will be opened if the traction drive switch 60 is moved to its drive position, unless the deadman switch 62 is simultaneously moved to its on position.

If the safety system 72 of FIG. 3 is connected in series with the ignition primary, the polarity of one of the safety switches 60 and 62 must be reversed, as just explained above. For example, the on and off positions of the deadman switch 62 may be reversed. In addition, the starting interlock switch 74 needs to be connected in series with the on contacts of the deadman switch 62, rather than in parallel with the off contacts. The starting interlock switch 74 must also be rearranged so that it is normally closed, rather than normally open, when the starting device 30 is not in use.

If the safety system 96 of FIG. 6 is connected in series with the ignition primary, both the drive contact 60b and the neutral contact 60c should be connected to the common lead 64. The starting interlock switch 74 is then connected in series with the drive contact 60b, and is reversed so that it is normally closed rather than normally open.

It will be understood that the safety systems of FIGS. 3 and 6, using the starting interlock switch 74, may be employed in connection with lawn mowers and other vehicles having electrically operated starting devices. Generally, such starting devices are controlled by a key switch, to prevent unauthorized starting of the engine. When such a key switch is employed, the starting interlock contacts may be incorporated into the key switch for use in the safety system. The starting interlock contacts may also be incorporated into any other suitable starting switch which may be employed.

The operation of the safety systems of FIGS. 2, 3 and 6 may be concisely summarized in the appended Tables 1, 2 and 3, respectively:

TABLE 1

| Lawn Mower State | Traction Drive Switch | "Deadman" Switch | Remarks |
|---|---|---|---|
| Engine starts and idles. | Off (Neutral) | Off | "Hands off" start or idle. |
| Engine dies. | Off | On | Operator must let go of deadman switch when he disengages drive, so that tying of the deadman switch is discouraged. |
| Engine dies. | On (Drive) | Off | Prevents runaway. |
| Engine runs in gear. | On (Drive) | On | Normal grass-cutting operation. |

LOGIC FOR FIG. 2

TABLE 2

LOGIC FOR FIG. 3

| Traction Drive Switch | "Deadman" Switch | Start Switch | Engine Status | Remarks |
|---|---|---|---|---|
| 1 Off (Neutral) | Immaterial | On | Starts | Prevents "in-gear" start. |
| 2 Off (Neutral) | Off | Off | Runs | Idle. |
| 3 On (Drive) | On | Off | Runs | Normal grass-cutting. |
| 4 Off (Neutral) | On | Off | Dies | Operator must disengage both deadman and drive switches. |
| 5 On (Drive) | Off | Off | Dies | Prevents runaway. |

TABLE 3

LOGIC FOR FIG. 6

| Traction Drive Switch | Start Switch | Engine Status | Remarks |
|---|---|---|---|
| Off (Neutral) | Off | Runs | Idle |
| Off (Neutral) | On | Starts | Safe Start |
| On (Drive) | On | No Start | Unsafe Start |

I claim:

1. A safety system for a lawn mower or other vehicle, comprising a traction drive system for selectively driving the vehicle along the surface of the ground, said traction drive system including control means movable between a drive position in which said traction drive system is actuated and a neutral position in which said traction drive system is not actuated, a traction drive switch operable by said traction drive system between a drive position when said traction drive system is actuated and a neutral position when said traction drive system is not actuated, said traction drive switch having first, second and third terminals and means for establishing a connection between said first and second terminals when said traction drive switch is in said drive position while establishing an electrical connection between said first and third terminals when said traction drive switch is in said neutral position, a deadman control movable on said vehicle between on and off positions and including biasing means biasing said control to said off position, a deadman switch operable by said deadman control between an on position when said deadman control is in its on position and an off position when said deadman control is in its off position, said deadman switch including first, second and third terminals and means for establishing a connection between said first and second terminals when said deadman switch is in its off position while establishing a connection between said first and third terminals when said deadman switch is in its on position, a drive motor on the vehicle and having a safety circuit for disabling said drive motor when said safety circuit is closed while enabling said drive motor when said safety circuit is open, first circuit elements connecting said first terminals of said traction drive switch and said deadman switch to opposite sides of said safety circuit, a second circuit element connected between said second terminals of said traction drive switch and said deadman switch, and a third circuit element connected between said third terminals of said tractions drive switch and said deadman switch, whereby said drive motor is disabled when said traction drive system is in said drive position while said deadman switch is in said off position, said drive motor being disabled when said traction drive switch is in said neutral position while said deadman switch is in said on position, said drive motor being enabled when said traction drive switch is in said neutral position while said deadman switch is in said off position.

2. A safety system according to claim 1, in which said deadman control comprises a control member movable on the lawn mower between the on and off positions.

3. A safety system according to claim 1, in which said deadman control comprises a control member movable upwardly and downwardly on the lawn mower between on and off positions, said control member being biased downwardly by gravity to its off position and being manually movable upwardly to its on position.

4. A safety system according to claim 1, in which said drive motor includes an ignition magneto, said safety circuit being connected to said magneto and being operative to short circuit said magneto to disable said drive motor.

5. A safety system for a lawn mower or other vehicle, comprising a traction drive system for selectively driving the vehicle along the surface of the ground, said traction drive system including control means movable between a drive position in which said traction drive system is actuated and a neutral position in which said traction drive system is not actuated, a traction drive switch operable by said traction drive system between a drive position when said traction drive system is actuated and a neutral position when said traction drive system is not actuated, said traction drive switch having first, second and third terminals and means for establishing a connection between said first and second terminals when said traction drive switch is in said drive position while establishing an electrical connection between said first and third terminals when said traction drive switch is in said neutral position, a deadman control movable on said vehicle between on and off positions and including biasing means biasing said control to said off position, a deadman switch operable by said deadman control between an on position when said deadman control is in its on position and an off position when said deadman control is in its off position, said deadman switch including first, second and third terminals and means for establishing a connection between said first and second terminals when said deadman switch is in its off position while establishing a connection between said first and third terminals when said deadman switch is in its on position, a drive motor on the vehicle and having a safety circuit for disabling said drive motor when said safety circuit is closed while enabling said drive motor when said safety circuit is open, first circuit elements connecting said first terminals of said traction drive switch and said deadman switch to opposite sides of said safety circuit, a second circuit element connected between said second terminals of said traction drive switch and said deadman switch, and a third circuit element connected between said third terminals of said traction drive switch and said deadman switch, whereby said drive motor is disabled when said traction drive system is in said drive position while said deadman switch is in said off position, said drive motor being disabled when said traction drive switch is in said neutral position while said deadman switch is in said on position, said drive motor being enabled when said traction drive switch is in said neutral position while said deadman switch is in said off position, said drive motor including a selectively operable starting device, said safety system including a starting interlock switch operable between an open position when said starting device is not in use and a closed position when said starting device is in use, and additional circuit means connecting said starting interlock switch between said first and second terminals of said deadman switch for disabling said drive motor when said traction drive switch is in its drive position while said starting interlock switch is in its closed position, said starting interlock switch thereby being effective to prevent said drive motor from starting when said traction drive switch is in its drive position regardless of the position of said deadman switch.

6. A safety system for a lawn mower or other vehicle, comprising a traction drive system for selectively driving the vehicle along the surface of the ground, said traction drive system including control means movable between a drive position in which said traction drive system is actuated and a neutral position in which said traction drive system is not actuated, a traction drive switch operable by said traction drive system between a drive position when said traction drive system is actuated and a neutral position when said traction drive system is not actuated, a deadman control movable on said vehicle between on and off positions and including biasing means biasing said control to said off position, a deadman switch operable by said deadman control between an on position when said deadman control is in its on position and an off position when said deadman control is in its off position, a drive motor on the vehicle for supplying power to said traction drive system and having a safety circuit for disabling said drive motor when said safety circuit is in a disabling condition while enabling said drive motor when said safety circuit is in an enabling condition, and circuit elements connecting said traction drive switch and said deadman switch into said safety circuit, said traction drive switch and said deadman switch including respective contact means for disabling said drive motor when said traction drive switch is in its drive position and said deadman switch is in its off position while causing said contact means of said deadman switch to be ineffective to disable said motor when said traction drive switch is in its drive position and said deadman switch is in its on position, said contact means being operative to enable said drive motor when said traction drive switch is in said neutral position and said deadman switch is in said off position while disabling said motor when said deadman switch is in its on position.

7. A safety system according to claim 6, in which said deadman control comprises a control member movable upwardly and downwardly on the vehicle between on and off positions, said control member being biased downwardly by gravity to its off position and being manually movable upwardly to its on position.

8. A safety system according to claim 6, in which said drive motor includes an ignition magneto, said safety circuit being connected to said magneto, said contact means being operative to short circuit said magneto to disable said drive motor.

9. A safety system for a lawn mower or other vehicle, comprising a traction drive system for selectively driving the vehicle along the surface of the ground, said traction drive system including control means movable between a drive position in which said traction drive system is actuated and a neutral position in which said traction drive system is not actuated, a traction drive switch operable by said traction drive system between a drive position when said traction drive system is actuated and a neutral position when said traction drive system is not actuated, a deadman control movable on said vehicle between on and off positions and including biasing means biasing said control to said off position, a deadman switch operable by said deadman control between an on position when said deadman control is in its on position and an off position when said deadman control is in its off position, a drive motor on the vehicle for supplying power to said traction drive system and having a safety circuit for disabling said drive motor when said safety circuit is in a disabling condition while enabling said drive motor when said safety circuit is in an enabling condition, and circuit elements connecting said traction drive switch and said deadman switch into said safety circuit, said traction drive switch and said deadman switch including respective contact means for disabling said drive motor when said traction drive switch is in its drive position and said deadman switch is in its off position while causing said contact means of said deadman switch to be ineffective to disable said motor when said traction drive switch is in its drive position and said deadman switch is in its on position, said contact means being operative to enable said drive motor when said traction drive switch is in said neutral position and said deadman switch is in said off position while disabling said motor when said deadman switch is in its on position, said drive motor including a selectively operable starting device, said safety system including a starting interlock switch operable to a first position when said starting device is not in use and a second position when said starting device is in use, additional circuit means connecting said starting interlock switch into said safety circuit, said starting interlock switch having additional contact means for disabling said motor when said starting switch is in said second position and said traction drive switch is in said drive position regardless of the position of said deadman switch.

* * * * *